UNITED STATES PATENT OFFICE.

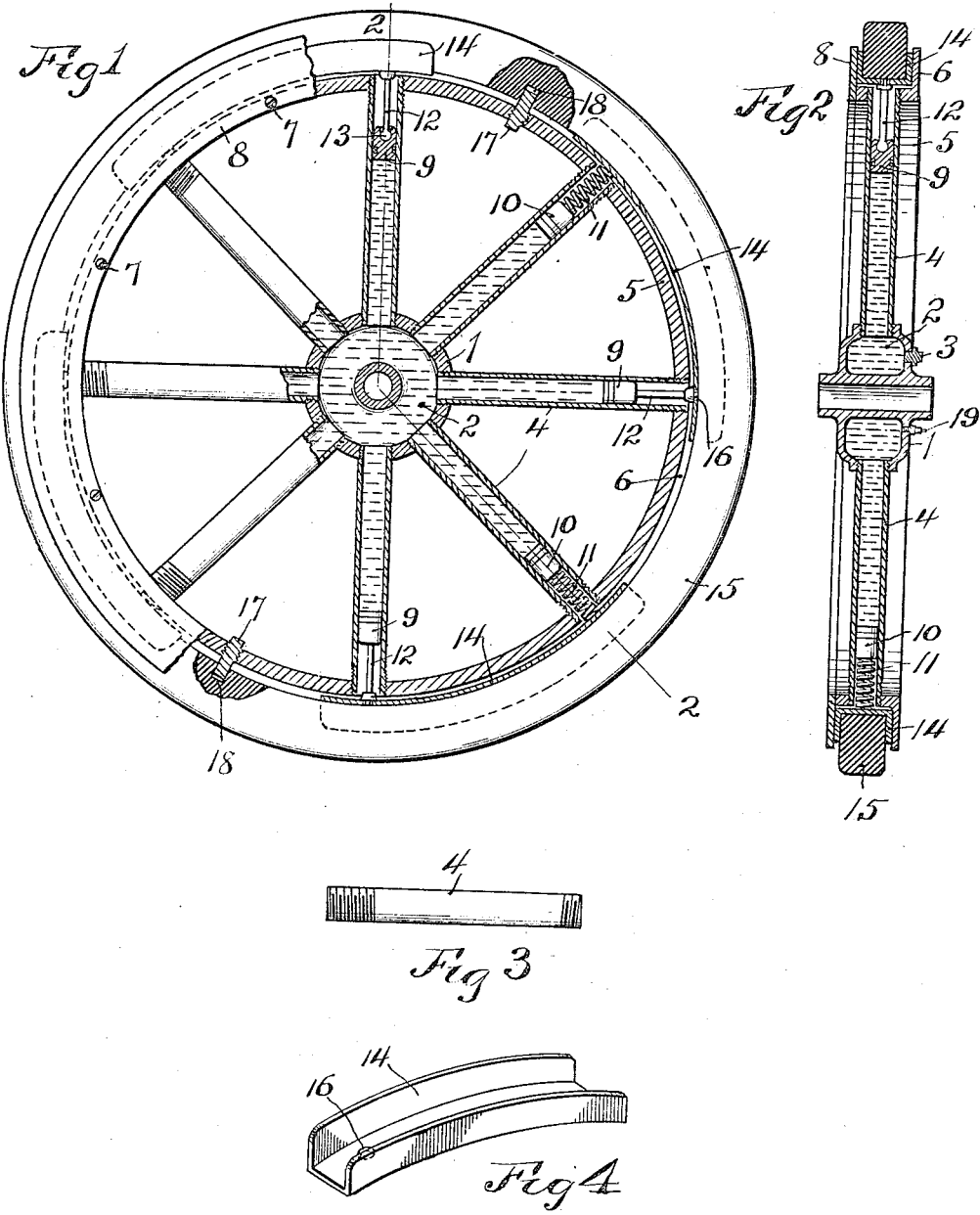

JAMES C. BEALE AND JAMES HAYES, OF KANSAS CITY, KANSAS.

VEHICLE-WHEEL.

1,266,654.  Specification of Letters Patent.  Patented May 21, 1918.

Application filed March 29, 1917. Serial No. 158,395.

*To all whom it may concern:*

Be it known that we, JAMES C. BEALE and JAMES HAYES, citizens of the United States, residing at Kansas City, in the county of Wyandotte and State of Kansas, have invented a certain new and useful Improvement in Vehicle-Wheels, of which the following is a specification.

Our invention relates to improvements in vehicle wheels.

The object of our invention, is to provide a vehicle wheel which may be advantageously employed for use in automobiles and similar vehicles in lieu of the ordinary vehicle wheel provided with a pneumatic tire.

A further object of our invention is to provide a vehicle wheel having great resiliency which is simple in construction, durable, not liable to get out of order, and which is economical to manufacture and to keep in repair.

The novel features of our invention are hereinafter fully described and claimed.

In the accompanying drawing which illustrates the preferred embodiment of our invention, Figure 1 is a view partly in side elevation and partly in section of our improved vehicle wheel.

Fig. 2 is a sectional view on the line 2—2 of Fig. 1.

Fig. 3 is a side view of one of the spokes.

Fig. 4 is a perspective view of one of the channel members in which the tire is mounted.

Similar reference characters designate similar parts in the different views.

1 designates the hub of the wheel which is provided with an annular chamber 2 having a filling opening normally closed by a screw plug 3, Fig. 2.

4 designates a plurality of tubular spokes having screw-threaded inner ends fitted respectively in radial screw-threaded holes provided in the periphery of the hub 1.

The outer ends of the spokes 4 are externally screw-threaded and are respectively fitted in radial holes provided in an annular rim member 5 having at one edge a peripheral flange 6 and having secured to its opposite edge by means of screws 7, Fig. 1, a ring 8, which with the rim member 5 forms a channel rim.

Slidably mounted respectively in alternate spokes 4 are pistons 9. Respectively mounted in the intermediate spokes are pistons 10.

A plurality of coil springs 11 are respectively mounted in the spokes which contain the pistons 10 and have their inner ends respectively bearing against the outer ends of said pistons.

Radial members comprising rods 12 are respectively mounted in the spokes containing the pistons 9 and have their inner ends respectively pivotally connected with said pistons. This pivotal connection is preferably composed of a ball 13 at the inner end of each rod 12 fitted in a socket provided in the outer end of the adjacent piston 9.

Mounted in the channel of the rim are a plurality of arcuate channel members 14, which are movable inwardly and outwardly in the rim and which have mounted in them and movable therewith a tire 15, preferably of resilient material, such as soft rubber. Each channel member 14 bears at its inner side against one of the springs 11 and against the outer end of the adjacent rod 12, the outer end of which is shouldered and loosely fitted in a hole 16 provided in the inner side of the member 14, against which the rod has a bearing.

The rim member 5 is provided with one or more radial screw-threaded holes in which are fitted radial screw plugs 17 which are adapted to extend into radial holes 18 provided in the inner side of the tire 15. The screw plugs 17 serve to prevent circumferential movement of the tire 15 in the rim.

The chamber 2 and the spokes 4 at the inner ends of the pistons 9 and 10 are filled with a fluid, preferably a liquid, such as oil.

When the wheel is running and the rim member 5 is forced downwardly by the load on the hub 1 and spokes 4, the oil in the spoke containing the lowermost piston, as the piston 9 in Fig. 1, will be forced upwardly in said spoke into the hub chamber 2 and thence into all the other spokes. The springs 11 will afford a resilient resistance to the pressure of the oil, and the tire 15 will also afford a resilient resistance to such oil pressure through the intermediacy of the other pistons 9, rods 12, and channel members 14, the tire also serving to receive the thrust outwardly of the springs 11.

The ends of the spokes 4 are reversely threaded, so that in assembling the parts of the wheel, the spokes may first be screwed into the rim member 5, and then into the hub 1.

The pistons 9 and 10 are then placed respectively in their spokes 4, after which the rods 12 and springs 11 are mounted in position in their respective spokes. The channel members 14 are then slipped upon the inner side of the tire 15, following which the tire and channel members are slid sidewise upon the rim member 5. The screw plugs 17 are then screwed into the holes 18. Oil is then forced through the filling opening of the hub into the chamber 2 and spokes 4, thereby forcing the pistons 9 and 10 outwardly until the springs 11 bear against the channel members 14 and the rods 12 bear against said channel members, the reduced outer ends of said rods being guided into the holes 16.

After the tire 15 has been expanded by the oil pressure, the plug 3 is inserted in the filling opening of the hub, following which the ring 8 is secured to the rim member 5 by the screws 7. There will now be a space between each of the channel members 14 and the rim 5, which will permit said channel members to move inwardly and outwardly with the tire 15 during the rotation of the wheel.

A valve plug 19, Fig. 2, of the ordinary type, such as is employed as an air filling tube on ordinary pneumatic tires, may be mounted on the hub 1 so as to communicate with the chamber 2. If desired, the chamber 2 and spokes 4 may be filled with oil through the valve plug or filling tube 19, by employing an ordinary pump, not shown, such as is used for pumping air into a pneumatic tire. The valve plug or filling tube 19 is of the usual spring actuated check valve type of a construction so well known that a description thereof is unnecessary.

We do not limit our invention to the structure shown and described, as modifications, within the scope of the appended claims, may be made without departing from the spirit of our invention.

What we claim is:—

1. In a vehicle wheel, a hub having a chamber, tubular spokes mounted on said hub and communicating interiorly with said chamber, a rim mounted on said spokes, pistons respectively slidable in said spokes, a tire encircling said rim and movable inwardly and outwardly relatively thereto, a liquid filling said chamber and said spokes to the inner ends of said pistons, a coil spring in one spoke and bearing against the outer end of the adjacent piston, a radial member in another one of said spokes bearing against the outer end of the adjacent piston, and means movable inwardly and outwardly with said tire for forcing said spring and said radial member inwardly.

2. In a vehicle wheel, a hub having a chamber, spokes including two tubular spokes mounted on said hub communicating interiorly with said chamber, a rim mounted on said spokes, pistons respectively slidable in said tubular spokes, a tire encircling said rim and movable inwardly and outwardly relatively thereto, a liquid filling said chamber and said tubular spokes to the inner ends of said pistons, a coil spring in one of said tubular spokes having one end bearing against the outer end of the adjacent piston, a radial member bearing against the outer end of the other piston, and a channel member movable inwardly and outwardly with said tire and bearing against said spring and said radial member.

3. In a vehicle wheel, a hub having a chamber, spokes including a tubular spoke mounted in said hub and communicating interiorly with said chamber, a piston slidable in said spoke, liquid filling said chamber and said spoke to the inner end of said piston, a coil spring having its inner end bearing against the outer end of said piston, a rim mounted on said spokes, a tire encircling said rim and movable inwardly and outwardly relatively thereto, and a member movable with said tire and bearing against the outer end of said spring.

4. In a vehicle wheel, a hub having a chamber, tubular spokes mounted on said hub and communicating interiorly with said chamber, a rim mounted on said spokes, pistons respectively slidable in said spokes, a tire encircling said rim and movable inwardly and outwardly relatively thereto, a fluid filling said chamber and said spokes to the inner ends of said spokes, a radial member pivoted to one of said pistons at the outer end thereof, a coil spring bearing at one end against the outer end of one of said pistons, and a channel member in which the tire is mounted and movable therewith and bearing against said spring and said radial member.

In testimony whereof we have signed our names to this specification.

JAMES C. BEALE.
JAMES HAYES.

Copies of this patent may be obtained for five cents each, by addressing the "Commissioner of Patents, Washington, D. C."